(12) United States Patent
Mazaud et al.

(10) Patent No.: US 6,625,986 B2
(45) Date of Patent: Sep. 30, 2003

(54) IC ENGINE-TURBOCHARGER UNIT FOR A MOTOR VEHICLE, IN PARTICULAR AN INDUSTRIAL VEHICLE, WITH TURBINE POWER CONTROL

(75) Inventors: Jean-Francois Mazaud, Arbon (CH); Juerg Spuler, Neukirch (CH)

(73) Assignee: Iveco Motorenforschung AG, Arbon (CH)

( * ) Notice: Subject to any disclaimer, the term of this patent is extended or adjusted under 35 U.S.C. 154(b) by 0 days.

(21) Appl. No.: 10/180,652

(22) Filed: Jun. 26, 2002

(65) Prior Publication Data

US 2003/0014973 A1 Jan. 23, 2003

(30) Foreign Application Priority Data

Jun. 26, 2001 (IT) ...................... TO2001A0615

(51) Int. Cl.[7] .............................................. F02D 23/00
(52) U.S. Cl. .......................... 60/602; 60/605.1; 60/612
(58) Field of Search .......................... 60/597, 600, 601, 60/602, 603, 605.1, 612

(56) References Cited

U.S. PATENT DOCUMENTS

| 4,291,535 A | * | 9/1981 | Goloff ......................... 60/602 |
| 4,657,476 A | * | 4/1987 | Berg ............................ 415/48 |
| 4,691,521 A | * | 9/1987 | Hirabayashi et al. ......... 60/602 |
| 5,775,105 A | * | 7/1998 | Zinsmeyer ................... 60/597 |
| 6,247,311 B1 | | 6/2001 | Itoyama et al. ................ 60/602 |
| 2001/0017033 A1 | | 8/2001 | McKinley et al. ......... 60/605.2 |

FOREIGN PATENT DOCUMENTS

| DE | 1580759 | 12/1980 |
| DE | 2353328 | 2/2001 |
| EP | 1031719 | 8/2000 |
| JP | 07336085 | 11/1995 |
| JP | 11282717 | 4/1999 |

* cited by examiner

*Primary Examiner*—Hoang Nguyen
(74) *Attorney, Agent, or Firm*—Frost Brown Todd LLC

(57) ABSTRACT

An engine-turbocharger unit for a vehicle, in particular an industrial vehicle, having an internal combustion engine; a decompression brake device; and a turbocharger in turn having a variable-geometry turbine driven by the exhaust gas from the engine, and a compressor driven by the turbine and connected at the outlet to an intake manifold of the engine; the unit also has a throttling device located on the outlet side of the turbine and settable between a fully-open attitude and a closed attitude; the variable-geometry turbine and the throttling device are jointly controlled, thereby allowing independent control of the exhaust manifold pressure of the combustion engine and of the expansion ratio of the turbine.

18 Claims, 1 Drawing Sheet

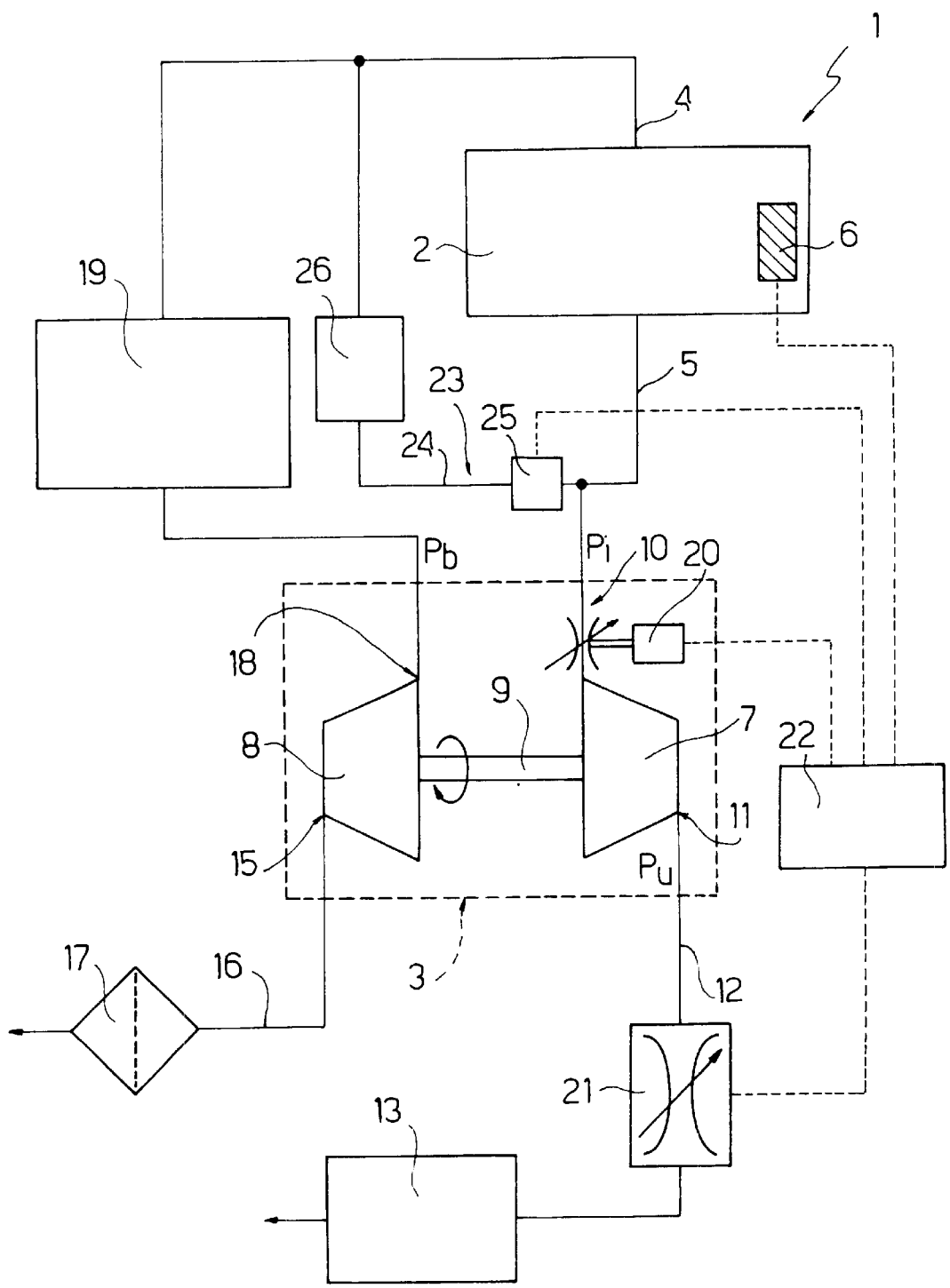

IC ENGINE-TURBOCHARGER UNIT FOR A MOTOR VEHICLE, IN PARTICULAR AN INDUSTRIAL VEHICLE, WITH TURBINE POWER CONTROL

The present invention relates to an engine-turbocharger unit for a vehicle, in particular an industrial vehicle, including an internal combustion engine, e.g. a diesel engine, and a turbocharger for supercharging the engine.

The engine includes a number of cylinders, each associated with at least an intake valve and at least an exhaust valve for selectively connecting the cylinder to an intake manifold and an exhaust manifold respectively.

The turbocharger comprises a turbine having an inlet connected to the exhaust manifold and therefore powered by the exhaust gas of the engine; and a compressor driven by the turbine and having an inlet connected to an air intake circuit, and an outlet connected to the intake manifold of the engine.

BACKGROUND OF THE INVENTION

As is known, in recent years IC engines have been devised featuring a decompression brake device or exhaust brake based on the principle of dissipating the compression energy originating in the engine cylinders to generate braking power, e.g. by opening the exhaust valves of the engine cylinders at the end of the compression stroke. The efficiency of this solution is increased by the supercharge provided by the turbocharger, which increases compression work and, hence, braking power.

Being a centrifugal machine, however, the contribution of the turbocharger decreases alongside a reduction in engine speed, so that, when the exhaust brake is activated at low engine speed, the decompression braking effect is poor, on account of the low intake pressure of the engine (boost pressure) and, hence, the small amount of compression energy dissipated.

To improve exhaust brake efficiency, turbochargers are commonly used featuring variable-geometry turbines (VGTs), i.e. turbines comprising a bladed rotor and a variable geometry nozzle surrounding the rotor and adjustable so as to vary the nozzle throat area of the turbine.

The variable geometry nozzle is adjusted as a function of the operating condition of the engine to permit continuous boost pressure control, i.e. to control the pressure of the output air from the compressor, which is substantially equal to the air pressure in the engine intake manifold.

More specifically, at low engine speed, the variable geometry nozzle is maintained in a closed attitude to minimize the nozzle throat area in the turbine and so increase the speed of the exhaust gas, so that the turbine rotor rotates faster to increase boost pressure.

Best braking power could be theoretically achieved by maintaining, at the same time, both boost pressure and the exhaust manifold pressure at their upper limit, i.e. as high as the engine mechanically allows.

However, at high engine speed, it is necessary to "open" the variable geometry nozzle, i.e. to increase the nozzle throat area, in order not to exceed the boost pressure an/or the turbocharger speed limit, which cannot be achieved without the natural consequence of the exhaust manifold pressure falling far below its target.

This happens because in known engine-turbocharger units boost pressure, turbocharger speed and exhaust manifold pressure ("pre-turbine" pressure) are inherently interrelated: opening the variable geometry nozzle leads to a decrease of pre-turbine pressure, due to a lower degree of throttling; this leads to a lower gas speed through the turbine, which results in lower turbine power and therefore lower speed of the turbocharger. Boost pressure is thereby reduced.

In conclusion, limiting the turbocharger speed and/or the boost pressure by increasing the turbine nozzle throat area inevitably reduces pre-turbine pressure and, hence, exhaust cycle work and its contribution to braking power.

In other words, to maintain a maximum permissible boost pressure or a maximum permissible turbocharger speed at high engine speed, the variable geometry nozzle throat may have to be so increased that the pre-turbine pressure and hence braking power fall below the desired level.

Engine-turbocharger units are also known in which the exhaust brake is not controlled by a variable geometry turbine, but by a throttle valve on the exhaust duct, downstream of the (fixed geometry) turbine exit, to generate a counterpressure in the manifold as a function of the throttle valve opening, so that, as the exhaust gas is expelled, the engine must work to overcome the counterpressure. When the decompression brake device is activated, the throttle valve is kept practically fully closed to obtain a high gas pressure in the exhaust manifold. On account of the extent to which the throttle valve is closed, such units are characterised by low gas flow and, hence, a low level of activity of the turbocharger, i.e. low turbine power, thus resulting in reduced air supply to the engine, an increase in temperature in the combustion chambers, and a reduction in the maximum braking power obtainable.

SUMMARY OF THE INVENTION

It is an object of the present invention to provide an engine-turbocharger unit for a vehicle, in particular an industrial vehicle, designed to eliminate the aforementioned drawbacks typically associated with known engine-turbocharger units.

According to the present invention, there is provided an engine-turbocharger unit for a motor vehicle comprising:
- an internal combustion engine having a decompression brake device;
- a variable geometry turbocharger comprising a turbine with a variable geometry nozzle connected to an exhaust manifold of said engine, said variable geometry nozzle enabling the control of turbine power according to operating conditions of said engine by commanding said variable geometry nozzle within its design-given geometrical restrictions, and a compressor driven by said turbine and having an outlet connected to an intake manifold of said engine;

characterised by comprising:
- a throttling device located on an outlet side of said turbine and settable between a maximum-opening attitude and a minimum-opening attitude; and
- control means for controlling both said variable geometry nozzle and said throttle device according to operating conditions of said engine, thereby allowing independent control of the exhaust manifold pressure of the combustion engine and of the expansion ratio of said turbine.

BRIEF DESCRIPTION OF THE DRAWING

The invention will be described with reference to the accompanying drawing, which shows, schematically, a preferred non-limiting embodiment of an engine-turbocharger unit for a vehicle in accordance with the teachings of the present invention.

DETAILED DESCRIPTION OF THE INVENTION

Number 1 in the accompanying drawing indicates as a whole an engine-turbocharger unit for a vehicle, in particular an industrial vehicle (not shown).

Unit 1 comprises an internal combustion engine 2, e.g. a diesel engine (known and therefore shown only schematically) supercharged by a turbocharger 3 and comprising a number of cylinders, each associated with at least an intake valve and at least an exhaust valve interposed between the cylinder and an intake manifold 4 and exhaust manifold 5 of engine 2 respectively.

The intake and exhaust valves of engine 2 are controlled by a known timing system (not shown), which comprises a decompression brake device 6 (known and therefore shown only schematically), e.g. of the type for opening the exhaust valves of the cylinders of engine 2 at the end of the compression stroke to dissipate the compression energy originating inside the cylinders and generate braking power.

Turbocharger 3 comprises a turbine 7 and a compressor 8 having respective rotors (not shown) rotationally coupled to each other by a common shaft 9. Turbine 7 is a variable-geometry (VGT) type powered by the exhaust gas from engine 2. More specifically, turbine 7 comprises a variable geometry nozzle 10 (hereinafter: VG nozzle) connected to exhaust manifold 5 of engine 2; and an outlet 11 connected to an exhaust circuit 12 for expelling the exhaust gas, terminating with a silencer 13.

Compressor 8 is driven by turbine 7 via shaft 9, and comprises an inlet 15 connected to an air intake circuit 16 having a filter 17; and an outlet 18 connected to intake manifold 4 of engine 2 via an intercooler 19.

VG nozzle 10 may be of any known type, e.g. "swing-vane" type or including an axially movable member varying the nozzle throat area AT; in any case, nozzle 10 includes a movable member commanded by an actuator 20 and adapted to vary the nozzle throat area AT through a range limited by design-given geometric restrictions, e.g. between a fully closed attitude and a fully open attitude of the VG nozzle 10.

According to the present invention, unit 1 also comprises a throttling device 21 located on the outlet side of turbine 7—i.e. at outlet 11 or along exhaust circuit 12, downstream from outlet 11—and which can be set between a maximum-opening or "open" attitude and a minimum opening or "closed" attitude.

Throttling device 21 may be either ON/OFF, step-adjustable or continuously adjustable between the closed and the open attitudes. For example, throttling device 21 may be a slide valve or a throttle valve, and may advantageously be incorporated in a flange on the casing (neither shown) of turbine 7.

If ON/OFF type, throttling device 21 conveniently maintains, in its closed attitude, a predetermined, substantial fraction of the unthrottled gas flow area, e.g. from 20% to 60% of the gas flow area in the fully open attitude of throttling device 21. Such a fraction is tuned so as to reduce the turbine expansion ratio only to an amount which is needed to keep turbo speed and boost pressure within their allowed limits in a maximum engine braking power condition. Due to the limited extent to which throttling device 21 is closed, large quantities of gas flow through unit 1 at all times, thus resulting in a high level of activity of turbocharger 3, i.e. in a high power level of turbine 7.

If step- or continuously adjustable, the closed attitude of throttling device 21 is conveniently substantially fluid-tight, a plurality of intermediate attitudes being available for control purposes, in this case, as hereinafter described.

A control unit 22 jointly controls the attitudes of the VG nozzle 10 and of throttling device 21 to allow independent control of the exhaust manifold pressure of the combustion engine 2, i.e. of pressure Pi upstream of turbine 7 ("pre-turbine pressure"), and of the expansion ratio (Pi/Pu) of turbine 7, i.e. of the ratio between pre-turbine pressure Pi and outlet pressure Pu of turbine 7.

Unit 1 may include an exhaust gas recirculation (EGR) system, referenced 23 as a whole, and including an EGR duct 24 connecting exhaust manifold 5 to intake manifold 4. EGR system 23 further includes a shutoff valve 25 and an EGR intercooler 26 along duct 24 to control EGR gas flow rate and temperature, respectively.

In use, as a basic control method, turbine power is controlled jointly by VG nozzle 10 and throttling device 21; the latter is used to reduce the natural turbine expansion ration where needed, otherwise is maintained fully open (default attitude). The basic control method is characterised in that the power of turbine 7—depending on the expansion ratio Pi/Pu of turbine 7—and pressure Pi are controlled in parallel to independent targets, by commanding both the VG nozzle 10 and throttling device 21. Downstream throttling is applied whenever the pre-turbine pressure Pi must be brought to higher target values, without the otherwise natural effect of rising turbine power, which in turn would lead to higher speed of the turbocharger 3 and higher boost pressure Pb.

The turbine power control method according to the present invention is particularly suitable for controlling engine brake and EGR system.

More particularly, in engine braking conditions (retarding mode) turbine power control according to the invention is used to achieve high pre-turbine pressure (Pi) targets without exceeding limit values of the turbocharger speed (TC speed) and/or boost pressure Pb.

For this purpose, throttling device 21 may be of ON/OFF type having a predetermined flow section in the ON attitude. The control method is as follows:

as long as TC speed and/or boost pressure limits are impossible to be reached, e.g. when engine speed is less than 50% of the allowed maximum speed, the engine retarding power is controlled solely by commanding the VG nozzle 10, thereby making use of the full VG nozzle attitude range within the given geometric restrictions;

when TC speed and/or boost pressure limit are reached or likely to be reached, i.e. when engine speed is more than 50% of the allowed maximum speed, throttling device 21 is set to its ON attitude; in the meantime, retarding torque remains controlled by commanding VG nozzle 10, thereby making use of the full VG nozzle attitude range.

The fraction of the gas flow section of throttling device 21 is pretuned so as to maintain turbine outlet pressure Pu below 2 bar and preferably about 0.5 bar, in maximum braking power conditions, which are reached at about 100% to 140% of the rated engine speed in firing mode. In the meantime, Pi is controlled by actuating VG nozzle 10 in order to maintain its allowed limits, e.g. 4–7 bar.

If throttling device 21 is step- or continuously adjustable, the following control method is used:

as long as TC speed and/or boost pressure limits are impossible to be reached, e.g. when engine speed is less than 50% of the allowed maximum speed, the engine retarding power is controlled solely by commanding the VG nozzle 10, thereby making use of the full VG nozzle attitude range within the given geometric restrictions;

when TC speed and/or boost pressure limit are reached, i.e. when engine speed is more than 50% of the allowed maximum speed, throttling device 21 is commanded to control TC speed and boost pressure according to their limits. In the meantime, retarding torque remains controlled by commanding VG nozzle 10, thereby again making use of the full VG nozzle attitude range.

The turbine power control method according to the present invention is used to enable EGR in engine operating conditions where boost pressure would naturally stay higher than pre-turbine pressure. Using high efficiency turbomachinery, boost pressure may exceed pre-turbine pressure in a wide operating area, e.g. from 40% to 120% of the rated engine speed. Using the throttling device 21, the ratio of boost pressure to pre-turbine pressure Pb/Pi becomes modulated. EGR flow is hereby enabled by controlling the pre-turbine pressure Pi to slightly higher values than boost pressure.

For this purpose, the throttling device 21 is preferably step- or continuously adjustable type. The default attitude is fully open. In the above-mentioned engine working points, where boost pressure is naturally higher than pre-turbine pressure but EGR flow is needed, EGR is enabled and controlled by the following steps:

opening the EGR shutoff valve commanding the VG nozzle 10 in order to establish a target value of air or oxygen flow to engine 2, thereby making use of the VG nozzle attitude range; and, in the meantime, commanding the throttling device (21) in order to establish a target EGR flow, thereby making use of the attitude range of the throttling device 21.

This control strategy allows independent parallel control of air or oxygen flow and EGR flow, which is impossible in known systems.

Clearly, changes may be made to engine-turbocharger unit 1 as described and illustrated herein without, however, departing from the scope of the accompanying claims.

What is claimed is:

1. An engine-turbocharger unit (1) for a motor vehicle comprising:
    an internal combustion engine (2) having a decompression brake device (6);
    a variable geometry turbocharger (3) comprising a turbine (7) with a variable geometry nozzle (10) connected to an exhaust manifold (5) of said engine, said variable geometry nozzle (10) enabling the control of turbine power according to operating conditions of said engine (2) by commanding said variable geometry nozzle (10) within its design-given geometrical restrictions, and a compressor (8) driven by said turbine (7) and having an outlet connected to an intake manifold (4) of said engine (2); characterised by comprising
    a throttling device (21) located on an outlet side of said turbine (7) and settable between a maximum-opening attitude and a minimum-opening attitude; and
    control means (22) for controlling both said variable geometry nozzle (10) and said throttling device (21) according to operating conditions of said engine (2), thereby allowing independent control of the exhaust manifold pressure (Pi) of the combustion engine (2) and of the expansion ratio (Pi/Pu) of said turbine.

2. A unit as claimed in claim 1, characterised in that said maximum opening attitude is a default attitude of said throttling device (21) maintained by said control means (22) unless a limitation of said expansion ratio (Pi/Pu) is needed to maintain operating parameters of the engine-supercharger unit (1), including at least boost pressure and rotational speed of said turbocharger (3), within their allowed limits.

3. A unit as claimed in claim 1, characterised in that said throttling device (21) is incorporated into an outlet duct of a turbine housing of said turbine (7).

4. A unit as claimed in claim 1, characterised in that said throttling device (21) is located downstream from said turbine (7), along an exhaust gas circuit (12) connected to an outlet (11) of said turbine (7).

5. A unit as claimed in claim 1, characterised in that said throttling device (21) is of ON/OFF type.

6. A unit as claimed in claim 5, characterised in that said minimum-opening attitude of said throttling device (21) maintains a substantial fraction of the unthrottled gas flow area, said fraction being tuned so as to reduce the turbine expansion ratio only to an amount which is needed to keep the speed of said turbocharger (3) and said boost pressure within their allowed limits in a maximum engine braking power condition.

7. A unit as claimed in claim 6, characterised in that the turbine outlet pressure is less than 2 bar in said maximum braking power condition.

8. A unit as claimed in claim 1, characterised in that said throttling device (21) is continuously adjustable between said maximum-opening attitude and said minimum-opening attitude.

9. A unit as claimed in claim 1, characterised in that said throttling device (21) is settable to a plurality of discrete attitudes between said maximum-opening attitude and said minimum-opening attitude.

10. A unit as claimed in claim 8, characterised in that said throttling device (21) is substantially fluid-tight in said minimum-opening attitude.

11. A unit as claimed in claim 1, including an EGR duct (24) connecting said exhaust manifold (5) to said intake manifold (4) of said engine (2) and a shut-off valve (25) selectively enabling EGR flow through said EGR duct (24).

12. A method of controlling an engine unit (1) for a vehicle, in particular an industrial vehicle, comprising:
    an internal combustion engine (2) having a decompression brake device (6);
    a variable geometry turbocharger (3) comprising a turbine (7) with a variable geometry nozzle (10) connected to an exhaust manifold (5) of said engine (2), said variable geometry nozzle (10) enabling the control of turbine power according to operating conditions of said engine (2) by commanding said variable geometry nozzle (10) within its design-given geometrical restrictions, and a compressor (8) driven by said turbine (7) and having an outlet connected to an intake manifold (4) of said engine (2);
    the method being characterised by including the step of independently controlling the exhaust manifold pressure (Pi) of the combustion engine (2) and the expansion ratio (Pi/Pu) of said turbine (7) by commanding both said variable geometry nozzle (10) and a throttling device (21) located on the outlet side of said turbine (7) and settable between a maximum-opening attitude and a minimum-opening attitude.

13. A method as claimed in claim 12, characterised by including the step of maintaining said maximum-opening attitude as a default attitude of said throttling device (21)

unless a limitation of said expansion ratio (Pi/Pu) is needed to maintain operating parameters of the engine-supercharger unit (1), including at least boost pressure and rotational speed of said turbocharger (3), within their allowed limits.

14. A method as claimed in claim 12, characterised by the step of maintaining the rotational speed of said turbocharger (3) within its allowed limit by modulating the attitude of said throttling device (21).

15. A method of controlling an engine-supercharger unit as claimed in claim 12, said engine-turbocharger unit including an EGR duct (22) connecting said exhaust manifold (5) to said intake manifold (4) of said engine (2) and a shut-off valve (23) selectively enabling EGR flow through said EGR duct (22), said method being characterised by including the step of controlling the attitude of said throttling device (21) in order to generate a required differential pressure value between said intake manifold (4) and said exhaust manifold (5) of said combustion engine (2).

16. A method as claimed in claim 15, characterised by the steps of opening said EGR shutoff valve and controlling said variable geometry nozzle (10) so as to establish a target air or oxygen flow, and in the meantime controlling said throttling device (21) to establish a target value of said EGR flow.

17. A method of controlling an engine-turbocharger unit as claimed in claim 12, wherein said throttling device (21) is of ON/OFF type, characterised by including the steps of activating said decompression device (6), controlling the retarding torque of said combustion engine (2) by modulating the attitude of said variable geometry nozzle (10) of said turbine (7) within its full range, and setting said throttling device (21) to said minimum-opening attitude in response to a predetermined threshold value of engine speed potentially leading to exceeding at least a safety limit of said engine-supercharger unit (1).

18. A method of controlling an engine-turbocharger unit as claimed in claim 12, wherein said throttling device (21) is step or continuously adjustable; characterised by including the steps of activating said decompression braking device (6), controlling the retarding torque of said combustion engine (2) by modulating the attitude of said variable geometry nozzle (10) of turbocharger (3) within its full range, and controlling the attitude of said throttling device (21) in order to maintain boost pressure and rotational speed of said turbocharger within their allowed limits.

* * * * *